United States Patent [19]
Crandall

[11] Patent Number: 6,075,577
[45] Date of Patent: Jun. 13, 2000

[54] CONTINUOUSLY VIEWABLE, DC FIELD-BALANCED, REFLECTIVE, FERROELECTRIC LIQUID CRYSTAL IMAGE GENERATOR

[75] Inventor: Charles M. Crandall, Tucson, Ariz.

[73] Assignee: Displaytech, Inc., Longmont, Colo.

[21] Appl. No.: 09/391,087

[22] Filed: Sep. 4, 1999

Related U.S. Application Data

[63] Continuation of application No. 09/025,160, Feb. 18, 1998.
[51] Int. Cl.$^7$ .......................... G02F 1/135; G02F 1/1335; C09K 19/02
[52] U.S. Cl. .................................. 349/25; 349/9; 349/117; 349/172
[58] Field of Search ................................. 349/25, 9, 172, 349/117

[56] References Cited

U.S. PATENT DOCUMENTS

| | | | |
|---|---|---|---|
| 5,126,864 | 6/1992 | Akiyama et al. | 349/75 |
| 5,264,951 | 11/1993 | Takanashi et al. | 349/25 |
| 5,716,122 | 2/1998 | Esaki et al. | 349/9 |
| 5,748,164 | 5/1998 | Handschy et al. | 345/89 |
| 5,808,800 | 9/1998 | Handschy et al. | 349/11 |
| 5,900,976 | 5/1999 | Handschy et al. | 359/495 |

OTHER PUBLICATIONS

Douglas J. McKnight, "Continuous view of dc–balanced images on a ferroelectric liquid–crystal spatial light modulator", Sep. 15, 1994, Optics Letters, Optical society of America.

Primary Examiner—William L. Sikes
Assistant Examiner—Tarifur R. Chowdhury
Attorney, Agent, or Firm—Jay R Beyer; Stephen C. Shear

[57] ABSTRACT

A reflection mode, ferroelectric liquid crystal spatial light modulating system, includes a light reflecting type spatial light modulator. The spatial light modulator has a light reflecting surface cooperating with a layer of ferroelectric liquid crystal light modulating medium switchable between first and second states so as to act on light in different first and second ways, respectively. A switching arrangement switches the liquid crystal light modulating medium between the first and second states and an illumination arrangement produces a source of light. An optics arrangement is optically coupled the spatial light modulator and the illumination arrangement such that light is directed from the source of light into the spatial light modulator for reflection back out of the modulator and such that reflected light is directed from the spatial light modulator into a predetermined viewing area. The optics arrangement includes a passive quarter wave plate positioned in the optical path between the light source and the spatial light modulator and in the optical path between the spatial light modulator and the viewing area. A compensator cell is also positioned in the optical path between the light source and the spatial light modulator and in the optical path between the spatial light modulator and the viewing area. The compensator cell has a layer of ferroelectric liquid crystal light modulating medium switchable between a primary and a secondary state so as to act on light in different primary and secondary ways, respectively.

22 Claims, 6 Drawing Sheets

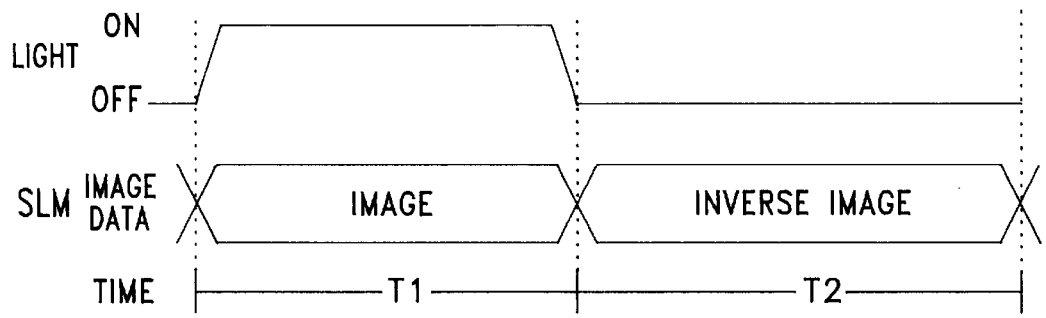
FIG. 1a (PRIOR ART)
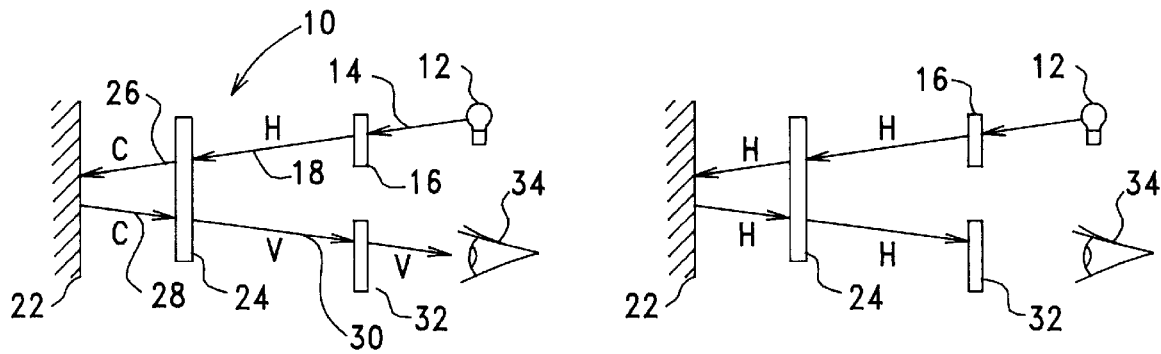
FIG. 1b
(PRIOR ART)
FIG. 1c
(PRIOR ART)
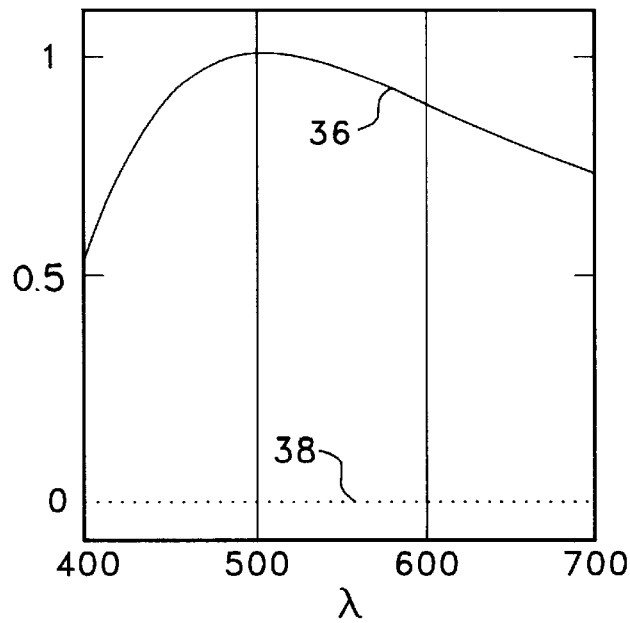
FIG. 1d
(PRIOR ART)

6,075,577

1

CONTINUOUSLY VIEWABLE, DC FIELD-BALANCED, REFLECTIVE, FERROELECTRIC LIQUID CRYSTAL IMAGE GENERATOR

This is a Continuation application of copending prior application Ser. No. 09/025,160, filed on Feb. 18, 1998, designated the United States, the disclosures of which are incorporated herein by reference.

BACKGROUND OF THE INVENTION

The present invention relates generally to image generating systems including reflective type, ferroelectric liquid crystal (FLC) spatial light modulator (STM). More specifically, lie invention relates to all optics arrangement including an FLC compensator cell for allowing the system to generate a substantially continuously viewable image while DC-balancing the FLC material of both the SLM and the compensator cell.

FLC materials may be used to provide a low voltage, low power reflective spatial light modulator due to their switching stability and their high birefringence. However, a problem with FLC materials, and nematic liquid crystal materials, is that the liquid crystal material may degrade over time if the material is subjected to an unbalanced DC electric field for an extended period of time. In order to prevent this degradation, liquid crystal spatial light modulators (SLMs) must be DC field-balanced.

Nematic liquid crystal materials respond to positive or negative voltages in a similar manner regardless of the sign of the voltage. Therefore, nematic liquid crystals are typically switched ON by applying either a positive or negative voltage through the liquid crystal material. Nematic liquid crystal materials are typically switched OFF by not applying any voltage through the material. Because nematic liquid crystal materials respond to voltages of either sign in a similar manner, DC balancing for nematic liquid crystal materials may be accomplished by simply applying an AC signal to create the voltage through the material. The use of an AC signal automatically DC balances the electric field created through the liquid crystal material by regularly reversing the direction of the electric field created through the liquid crystal material at the frequency of the AC signal.

In the case of FLC materials, the materials arc switched to one state (i.e. ON) 1 applying a particular voltage through the material (i.e. +5 VDC) and switched to the other state (i.e. OFF) by applying a different voltage through the material (i.e. −5 VDC). Because FLC materials respond differently to positive and negative voltages, they cannot be DC-balanced in situations where it is desired to vary the ratio of ON time to OFF time arbitrarily. Therefore, DC field-balancing for FLC SLMs is most often accomplished by displaying a frame of image data for a certain period of time, and then displaying a frame of the inverse image data for an equal period of time in order to obtain an average DC field of zero for each pixel making up the SLMs.

In the case of an image generating system or display, the image produced by the SLM during the time in which the frame is inverted for purposes of DC field-balancing may not typically be viewed. If the system is viewed during the inverted time without correcting for the inversion of the image, the image would be distorted. In the case in which the image is inverted at a frequency faster than the critical flicker rate of the human eye, the overall image could be completely washed out and all of the pixels would appear to be half on. In the case in which the image is inverted at a

2 frequency slower than the critical clicker rate of the human eye, the viewer would see the image switching between the positive image and the inverted image. Neither of these situations would provide a usable display.

In one approach to solving this problem, the light source used to illuminated the SLM is switched off or directed away from the SLM during the time when the frame is inverted. This type of system is described in copending U.S. patent application Ser. No. 08-361,775, filed Dec. 22, 1994, entitled DC FIELD-BALANCING TECHNIQUE FOR AN ACTIVE MATRIX LIQUID CRYSTAL IMAGE GENERATOR, which is incorporated herein by reference. However, this approach substantially limits the brightness and efficiency of the system. In the case where the magnitude of the electric field during the DC field-balancing and the time when the frame is inverted is equal to the magnitude of the electric field and the time when the frame is viewed, only a maximum of 50% of the light from a given light source may be utilized. This is illustrated in FIG. 1a which is a timing diagram showing the relationship between the switching on and off of the light source and the switching of the SLM image data.

As shown in FIG. 1a, the light source is switched on for a period of time indicated by T1. During this time T1, the SLM is switched to form a desired image. In order to DC balance the SLM, the SLM is switched to form the inverse of the desired image during a time period T2. In order to prevent this inverse image from distorting the desired image, the light source is switched off during the time T2 as shown in FIG. 1a.

In order to establish a convention to be used throughout this description, the operation of a given pixel 10 of a reflective type FLC SLM using the above mentioned approach of switching off the light source during the time the frame is inverted will be described with reference to FIGS. 1b–d. FIG. 1b shows pixel 10 when it is in its bright state and FIG. 1c shows pixel 10 when it is in its dark state. As illustrated in both FIGS. 1b and 1c, a light source 12 directs light, indicated by arrow 14, into a polarizer 16. Polarizer 16 is arranged to allow, for example, horizontally linearly polarized light, indicated by the reference letter 11 and by arrow 18, to pass through polarizer 16. However, polarizer 16 blocks any vertically linearly polarized component of the light and thereby directs only horizontally linearly polarized light into pixel 10. This arrangement insures that only horizontally linearly polarized light is used to illuminate pixel 10. For purposes of clarity throughout this description, the various configurations will be described using horizontally linearly polarized light as the initial input light for each of the various configurations.

As also illustrated in FIGS. 1b and 1c, pixel 10 includes a reflective backplane 22 and a layer of FLC material 24 which is supported in front of reflective backplane 22 and which acts as the light modulating medium. The various components would typically be positioned adjacent one another, however, for illustrative purposes, the spacing between the various components is provided. In this example, the FLC material has a thickness and a birefringence which cause the material to act as a quarter wave plate for a given wavelength. In this example, the FLC material is typical of those readily available and has a birefringence of 0.142. Therefore a thickness of 900 nm causes the SLM to act as a quarter wave plate for a wavelength of approximately 510 nm.

FLC material 22 has accompanying alignment layers (not shown) at the surfaces which have a buff axis or alignment axis that controls the alignment of the molecules of the FLC material. For this example of a reflective mode SLM, the SLM is oriented such that the alignment axis is rotated 22.5 degrees relative to the polarization of the horizontally linearly polarized light being directed into the SLM. The FLC also has a tilt angle of 22.5 degrees associated with the average optic axis of the molecules making up the FLC material. Therefore, when FLC material 24 of the pixel is switched to its first state, in this case by applying a +5 VDC electric field across the pixel, the optic axis is rotated to a 45 degree angle relative to the horizontally linearly polarized light. This causes the pixel to act as a quarter wave plate for horizontally linearly polarized light at 510 nm. Alternatively, when the pixel is switched to its second state, in this case by applying a −5 VDC electric field across the pixel, the optic axis is rotated to a zero degree angle relative to the horizontally linearly polarized light. This causes the pixel to have no effect on the horizontally linearly polarized light directed into the pixel. In other words, the tilt angle is the angle that the FLC optic axis is rotated one side or the other of the buff axis when the FLC material is switched to its first and second states.

Now that the configuration of the pixel for this example has been described, its effect on the light as it passes through the various elements will be described. Initially, it will be assumed the light is monochrome at the wavelength at which the SLM acts as a quarter wave plate, in this case 510 nm. As illustrated in FIG. 1b, when the FLC material is switched to its first state, which will be referred to hereinafter as its A state, FLC material 24 converts the 510 nm wavelength horizontally linearly polarized light directed into the pixel and indicated by arrow 18 into circularly polarized light indicated by the reference letters C and arrow 26. Reflective backplane 22 reflects this circularly polarized light as indicated by arrow 28 and directing it back into FLC material 24. FLC material 24 again acts on the light converting it from circularly polarized light to vertically linearly polarized light as indicated by reference letter V and arrow 30. The vertically linearly polarized light 30 is directed into an analyzer 32 which is configured to pass vertically linearly polarized light and block horizontally polarized light. Since analyzer 32 is arranged to pass vertically linearly polarized light, this vertically linearly polarized light indicated by arrow 30 passes through analyzer 32 to a viewing area indicated by viewer 34 causing the pixel to appear bright to the viewer.

Alternatively, as illustrated in FIG. 1c, FLC material 24 has no effect on the horizontally linearly polarized light directed into the pixel when the pixel is in its second state, which will be referred to hereinafter as its B state. This is the case regardless of the wavelength of the light. Therefore, the horizontally linearly polarized light passes through FLC material 24 and is reflected by reflective backplane 22 back into FLC material 24. Again, FLC material 24 has no effect on the horizontally linearly polarized light. And finally, since analyzer 32 is arranged to block horizontally linearly polarized light, the horizontally linearly polarized light is prevented from passing through to viewing area 34 causing the pixel to appear dark.

Although the polarization state of the light is relatively straight forward when the light is assumed to be at a wavelength at which the SLM acts as a quarter wave plate, it becomes more complicated when polychromatic light is used. This is because even if the birefringence Δn of the FLC were constant, the retardance of the SLM in waves would vary with wavelength; furthermore, the birefringence of the FLC material also varies as the wavelength of the light varies. In display applications, this becomes very important due to the desire to provide color displays. FIG. 1d illustrates the effects the SLM has on visible light ranging in wavelength from 400 nm to 700 nm as a function of the wavelength of the light assuming typical FLC birefringence dispersions. Solid line 36 corresponds to the first case when the pixel is in its A state as illustrated in FIG. 1b and the dashed line 38 corresponds to the second case when the pixel is in its B state as illustrated in FIG. 1c. As is illustrated in FIG. 1d, the resulting output of this configuration varies substantially depending on the wavelength of the light as indicated by line 36. In fact, only a little more than 50% of the horizontally linearly polarized light at 400 nm that is directed into the SLM is converted to vertically linearly polarized light using this configuration.

The above described configuration makes use of crossed polarizers. That is, polarizer 16 blocks vertically linearly polarized light and analyzer 32 blocks horizontally linearly polarized light. This means that polarizer 16 and analyzer 32 must be different elements. If both polarizer 16 and analyzer 32 were configured to pass the same polarization of light, they would be referred to as parallel polarizers and could be provided by the same element.

In an alternative system configuration, a polarizing beam splitter may be used to replace both the polarizer and the analyzer. FIGS. 1e and 1f illustrate such a system when pixel 10 is in its A and B states respectively. In this alternative system, light from light source 12 is directed into a polarizing beam splitter (PBS) 40 as indicated by arrow 42. PBS 40 is configured to reflect horizontally linearly polarized light as indicated by arrow 44 and pass vertically linearly polarized light as indicated by arrow 46. The horizontally linearly polarized light indicated by arrow 44 is directed into SLM 24.

When pixel 10 is in its A state as illustrated in FIG. 1e, SLM 24 acts as a quarter wave plate as described above converting the horizontally linearly polarized light to circularly polarized light and reflective backplane 22 reflects this light back into SLM 24. Again, SLM 24 converts this circularly polarized light into vertically linearly polarized light as described above for FIG. 1b and as indicated by arrow 48. Since PBS 40 is configured to pass vertically linearly polarized light, this light passes through PBS 40 into viewing area 34 causing pixel 10 to appear bright.

When pixel 10 is in its B state as illustrated in FIG. 1f, SLM 24 has no effect on the horizontally linearly polarized light. Therefore, the horizontally linearly polarized light that is directed into SLM 24 as indicated by arrow 44 remains horizontally linearly polarized light as it passes through SLM 24, is reflected by backplane 22, and again passes through SLM 24. However, since PBS 40 is configured to reflect horizontally linearly polarized light, this light is reflected back toward light source 12 as indicated by arrow 50 causing pixel 10 to appear dark.

As mentioned above, in the configuration currently being described, the light source is turned off during the time in which the image is inverted for purposes of DC field-balancing the FLC material as illustrated in FIG 1a. This substantially reduces the brightness or efficiency of the display. In order to overcome this problem of not being able to view the system during the DC field-balancing frame inversion time, compensator cells have been proposed for transmissive SLMs such as those described in U.S. Pat. No. 5,126,864. These compensator cells are intended to correct for the frame inversion during the time when the FLC pixel is being operated in its inverted state. FIG. 2a illustrates a transmissive mode system 200 which includes an SLM 202, a compensator cell 204, a polarizer 206, and an analyzer 208.

As described above for the FLC material of the SLM of the previous configuration, SLM 202 and compensator cell 204 each include an FLC layer which is switchable between an A and a B state. This results in four possible combinations of states for the SLM and compensator cell. For purposes of consistency in comparing various configurations described herein, these four cases will be defined as follows:

Case 1—compensator cell in B state, SLM pixel in A state
Case 2—compensator cell in B state, SLM pixel in B state
Case 3—compensator cell in A state, SLM pixel in B state
Case 4—compensator cell in A state, SLM pixel in A state For this configuration, Cases 1 and 2 correspond to the normal operation of the system during which the compensator cell is in its B state and the SLM pixels are switched between their A and B states to respectively produce a bright or dark pixel. This is illustrated in the first half of FIG. 2b which is a timing diagram showing the states of the light source, the SLM, and the compensator cell. As shown in FIG. 2b, the light source remains ON throughout the operation of the system. During the first half of the time illustrated in FIG. 2b, the pixels of the SLM are switched between their A and B states to produce a desired image. Cases 3 and 4 correspond to the time during which the frame is inverted for purposes of DC field balancing (i.e. the SLM pixel states must be reversed) and the compensator cell is switched to its A state to compensate for the inversion. This is illustrated by the second half of the diagram of FIG. 2b. To properly DC field-balance the display as well as allow the display to be viewed continuously, Case 1 and Case 3 must give the same results and Case 2 and Case 4 must give the same results. That is, for this configuration, Cases 1 and 3 must both produce a bright pixel and Cases 2 and 4 must both produce a dark pixel.

In this example of a transmissive mode system, both the FLC layer of the SLM pixel and the compensator cell are 1800 nm thick which causes them to act as a half wave plate for a wavelength of 510 nm when in the ON state. In this configuration, the polarizer and analyzer perform the functions performed by polarizer 16 and analyzer 32, or alternatively PBS 40, of the reflective mode systems described above. Polarizer 206 is positioned optically in front of compensator cell 204 and the SLM pixel 202 such that it allows only horizontally linearly polarized light to pass through it into compensator cell 204. Also, analyzer 208 which only allows vertically linearly polarized light to pass through is positioned optically behind SLM 202.

FIGS. 2c and 2d illustrate the net result the above described transmissive system configuration has on light directed in to the system. FIG. 2c shows the results for Case 1 and 2 during which the compensator cell is in its B state and the SLM is switched between its A state for Case 1 and its B state for Case 2. Case 1 is indicated by solid line 210 and Case 2 is indicated by dashed line 212. FIG. 2d shows the results for Case 3 and 4 during which the compensator cell is in its A state and the SLM is switched between its B state for Case 3 and its A state for Case 4. Case 3 is represented by solid line 214 and Case 4 is represented by dashed line 216.

As clearly shown by FIGS. 2c and 2d, this transmissive configuration produces identical results, that is a bright pixel, for Case 1 and 3 as indicated by lines 210 and 214, respectively. It also produces identical results for Cases 2 and 4 as indicated by lines 212 and 216, respectively. It should also be noted that this configuration produces relatively good results over the entire wavelength range from 400 nm to 700 nm. The worst results are at 400 nm where approximately 80% of the horizontally linearly polarized light is converted to vertically polarized light.

Although the compensator cell approach works well for a transmissive SLM as described above, applicant has found that this same general approach does not work as well for a reflective type SLM. To illustrate this difference, and referring to FIG. 3a, a reflective type display system 300 including a reflective type SLM 302 having a reflective backplane 303, a compensator cell 304, a polarizer 306, and an analyzer 308 will be described. Compensator cell 304 is positioned adjacent to SLM 302. As described above for FIGS. 1b and 1c, polarizer 306 is positioned to direct only horizontally linearly polarized light into compensator cell 304. Because the light passes through the SLM and the compensator cell twice in a reflective mode system, the FLC material of SLM 302 and compensator cell 304 are configured to act as quarter wave plates for a wavelength of 510 nm rather than half wave plates as described above for the transmissive system of FIG. 2a.

In this example, the FLC materials of both SLM 302 and compensator cell 304 are 900 nm thick and both have a tilt angle of 22.5 degrees. The buff axis of the SLM is aligned with the horizontally linearly polarized light directed into the system by polarizer 306. Also, the buff axis of compensator cell 304 is positioned perpendicular to the buff axis of SLM 302. FIGS. 3b and 3c illustrate the net result that system 300 has on light directed in to the system. FIG. 3b shows the results for Case 1 and 2 during which the compensator cell is in its B state and the SLM is switched between its A state for Case 1 and its B state for Case 2. Case 1 is indicated by solid line 310 and Case 2 is indicated by dashed line 312. FIG. 3c shows the results for Case 3 and 4 during which the compensator cell is in its A state and the SLM is switched between its B state for Case 3 and its A state for Case 4. Case 3 is represented by solid line 314 and Case 4 is represented by dashed line 316.

As clearly shown by FIGS. 3b and 3c, system 300 produces identical results, that is, a bright pixel for Case 1 and 3 as indicated by lines 310 and 314, respectively. It also produces identical results for Cases 2 and 4 as indicated by lines 312 and 316, respectively. However, this configuration does not produces very good results over the entire wavelength range from 400 nm to 700 nm. The worst results are at 400 nm where only approximately 5% of the horizontally linearly polarized light is converted to vertically polarized light. At a wavelength of about 500 nm about 50% of the horizontally linearly polarized light is converted to vertically linearly polarized light. The best results are at 700 nm where about 80% of the horizontally linearly polarized light is converted to vertically linearly polarized light. Since the point to adding the compensator cell is to increase the efficiency or brightness of the system, this arrangement does not improve the efficiency or brightness for the lower wavelength range when compared to the system of FIG. 1b and 1c which simply turns OFF the light source during the DC field-balancing time.

As can be clearly seen when comparing FIGS. 3b–c to FIGS. 2c–d, the effects on the light caused by the various components of the reflective configuration of FIG. 3a are very much different from the effects on the light caused by the transmissive configuration of FIG. 2a. That is, the reflective configuration of FIG. 3a is not optically equivalent to the transmissive configuration of FIG. 2a even though it may initially seem as though they should be optically equivalent. These two configurations are optically different from one another because the light must pass through the SLM and compensator cell twice in the reflective configuration with the first pass through the compensator being before the two passes through the SLM and the second pass through the compensator cell being after the two passes through the SLM.

Due to this difference in the transmissive and reflective configurations, it has proved difficult to provide a reflective type system which is DC field-balanced and is substantially continuously viewable while providing improved efficiency or brightness compared to a system which simply turns off the light source during the DC field-balancing portion of the frame. The present invention provides arrangements and methods for overcome this problem.

SUMMARY OF THE INVENTION

As will be described in more detail hereinafter, a reflection mode, spatial light modulating system and methods of operating the system are herein disclosed. The reflection mode, ferroelectric liquid crystal spatial light modulating system, includes a light reflecting type spatial light modulator. The spatial light modulator has a light reflecting surface cooperating with a layer of ferroelectric liquid crystal light modulating medium switchable between first and second states so as to act on light in different first and second ways, respectively. A switching arrangement switches the liquid crystal light modulating medium between the first and second states and an illumination arrangement produces a source of light. An optics arrangement is optically coupled the spatial light modulator and the illumination arrangement such that light is directed from the source of light into the spatial light modulator for reflection back out of the modulator and such that reflected light is directed from the spatial light modulator into a predetermined viewing area. A compensator cell is also positioned in the optical path between the light source and the viewing area. The compensator cell has a layer of ferroelectric liquid crystal light modulating medium switchable between a primary and a secondary state so as to act on light in different primary and secondary ways, respectively.

In one embodiment, the optics arrangement includes a passive quarter wave plate positioned in the optical path between the light source and the spatial light modulator and in the optical path between the spatial light modulator and the viewing area. In this embodiment, the compensator cell is positioned in the optical path between the light source and the spatial light modulator and in the optical path between the spatial light modulator and the viewing area.

BRIEF DESCRIPTION OF THE DRAWINGS

The features of the present invention may best be understood by reference to the following description of the presently preferred embodiments together with the accompanying drawings.

FIG. 1a is a timing diagram illustrating the timing at which a light source for a prior art DC-balanced display system is switched ON and OFF.

FIGS. 1b and 1c are diagrammatic cross sectional views of a pixel of a prior art reflective type SLM display system illustrating how the pixel acts on light when the pixel is in the ON and OFF states.

FIG. 1d is a graph illustrating the effects the system of FIG. 1b and 1c has on light after it passes through the system.

FIG. 5 is a diagrammatic cross sectional view of a third embodiment of a reflective SLM display system designed in accordance with the present invention.

DETAILED DESCRIPTION OF THE PREFERRED EMBODIMENTS

An invention is described for providing methods and apparatus for producing a substantially continuously viewable reflective type SLM display system which is DC field-balanced and which is more efficient or brighter than would be possible using a reflective type SLM display system which simply turns off the light source during the DC field balancing portion of each image frame. In the following description, numerous specific details are set forth in order to provide a thorough understanding of the present invention. However, based on the following description, it will be obvious to one skilled in the art that the present invention may be embodied in a wide variety of specific configurations. Also, well known processes for producing various components and certain well known optical effects of various optical components will not be described in detail in order not to unnecessarily obscure the present invention.

Figure 4A:
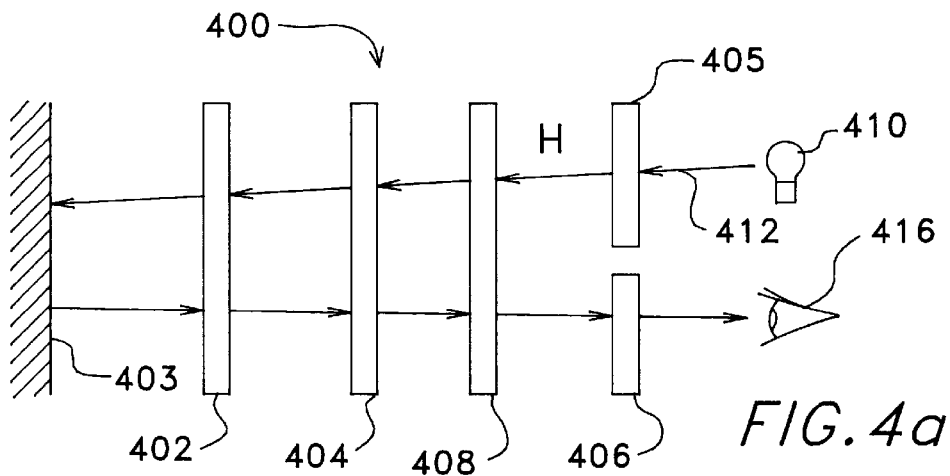
FIG. 4a is a diagrammatic cross sectional view of a first embodiment of a reflective SLM display system designed in accordance with the present invention.

Referring initially to FIG. 4a, the present invention will be described with reference to a first embodiment of the invention which takes the form of a reflective type SLM display system generally designated by reference numeral 400. As illustrated in FIG. 4a, system 400 includes an SLM 402 having a reflective backplane 403, a compensator cell 404, a polarizer 405, and an analyzer 406. Alternatively, in the same manner as described above, crossed polarizer 405 and analyzer 406 may be replaced with a polarizing beam splitter.

Figure 3A:
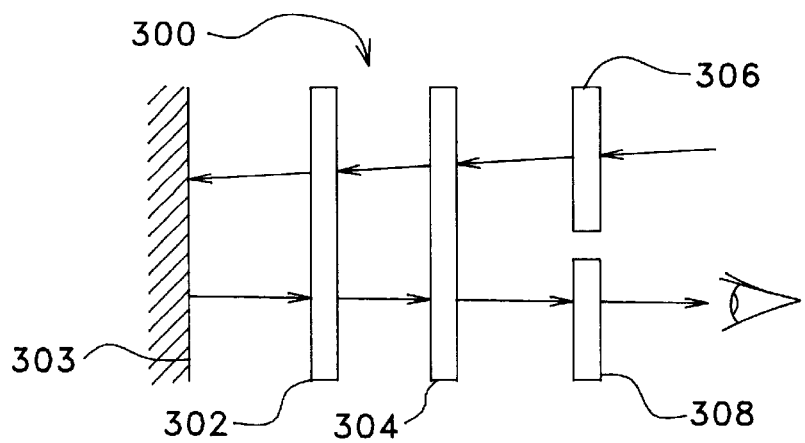
FIG. 3a is a diagrammatic cross sectional view of a prior art reflective SLM display system.

System 400 is configured in a manner similar to that described above for system 300 of FIG. 3a. That is, compensator cell 404 is positioned adjacent SLM 402. Also, polarizer 405 is positioned to direct only horizontally linearly polarized light into compensator cell 404. Similarly, analyzer 406 allows only vertically linearly polarized light to pass through it and into the viewing area after the light directed in to the system has passed through compensator cell 404 and SLM 402 and been reflected back through SLM 402 and compensator cell 404. However, in accordance with the invention, system 400 also includes a static quarter wave plate 408 positioned optically between compensator cell 404 and polarizer 405 and analyzer 406.

As would be understood by those skilled in the art, SLM 402 may be made up of an array of any number of individually controllable pixels which are individually switchable between two states. For purposes of consistency, it will be assumed that each pixel is switched to its A state by applying a +5 VDC electric field through the pixel and each pixel is switched to its B state by applying a −5 VDC electric field through the pixel. It should be understood that the present invention is not limited to these specific voltages and would equally apply regardless of the voltages used to switch the pixels.

Figure 1E:
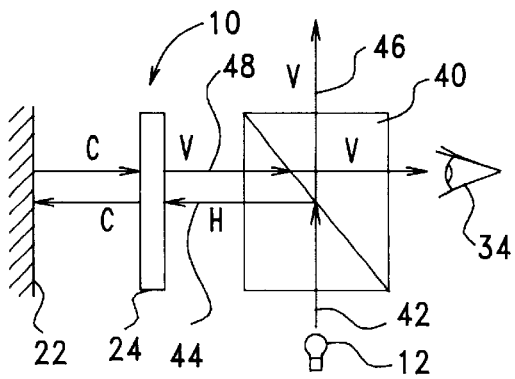
FIGS. 1e and 1f are diagrammatic cross sectional views of a pixel of a prior art reflective type SLM display system including a polarizing beam splitter.
Figure 1F:
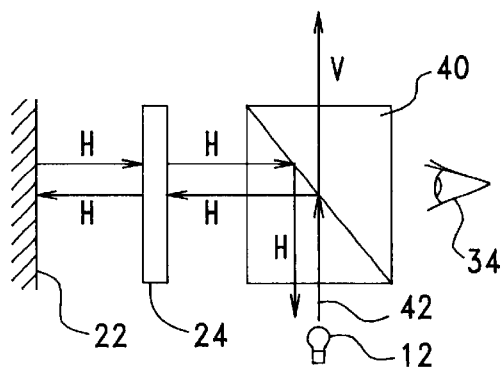
Figure 2A:
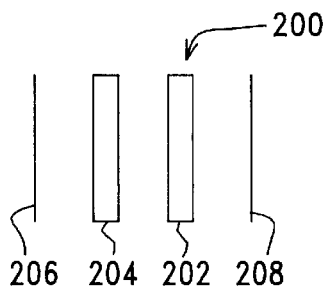
FIG. 2a is a diagrammatic cross sectional view of a prior art transmissive SLM display system.
Figure 2B:
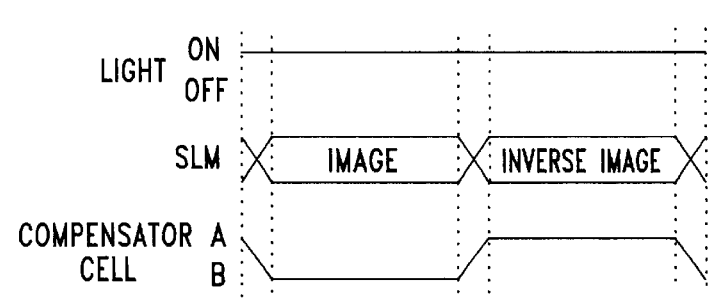
FIG. 2b is a timing diagram illustrating the timing at which a light source for a prior art DC-balanced display system is switched ON and OFF.
Figure 2C:
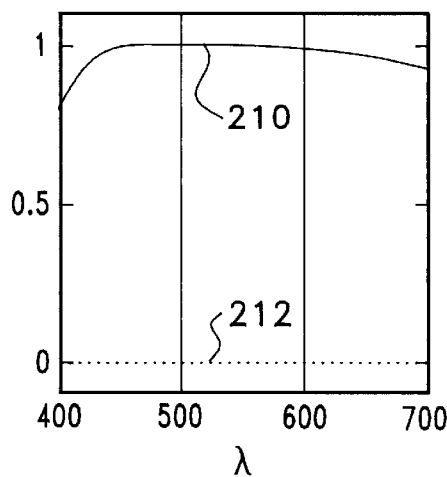
FIGS. 2c and 2d are graphs illustrating the effects the system of FIG. 2a has on light after it passes through the system.
Figure 2D:
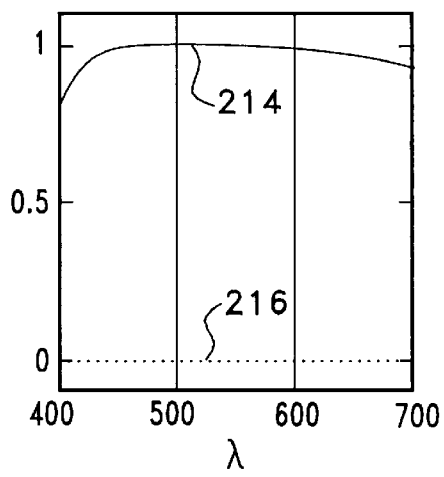

System 400 further includes a light source 410 for directing light into the system in a manner similar to that described above for FIGS. 1b and 1c. With this configuration, light source 410 directs light into polarizer 405 as indicated by arrow 412. Polarizer 405 blocks any vertically linearly polarized portions of the light from passing through polarizer 405 an allows only horizontally linearly polarized portions of the light to pass through polarizer 405 into static quarter wave plate 408. This light passes through static quarter wave plate 408, compensator cell 404, and SLM 402 and is then reflected by reflective backplane 403 back through SLM 402, compensator cell 404, and static wave plate 408 to analyzer 406 as illustrated in FIG. 4a. Analyzer 406 then blocks any horizontally linearly polarized portions of the light and allows only vertically linearly polarized portions of the light to pass through it to a viewing area indicated by viewer 416. Since polarizer 405 blocks vertically linearly polarized light and analyzer 406 blocks horizontally linearly polarized light, this type of system is referred to as using crossed polarizers.

For this embodiment and as described above for system 300, because the light passes through the SLM and the compensator cell twice in a reflective mode system, the FLC material of SLM 402 and compensator cell 404 are configured to act as quarter wave plates for a wavelength of 510 nm. In this configuration, the FLC materials of both SLM 402 and compensator cell 404 are 900 nm thick and both have a tilt angle of 22.5 degrees. In this specific embodiment, the buff axis of the SLM is positioned at a 22.5 degree angle relative to the horizontally linearly polarized light directed into the system. Also, for this embodiment, the buff axis of compensator cell 404 is positioned perpendicular to the buff axis of SLM 402.

Although the buff axis of the SLM is described as being positioned at 22.5 degrees relative to the horizontally linearly polarized light directed into the system, this is not a requirement. In fact, this configuration works equally as well regardless of the orientation of the SLM buff axis relative to the horizontally linearly polarized light directed into the system so long as the buff axis of the compensator cell is oriented perpendicular to the buff axis of the SLM. This freedom in orienting the buff axis of the SLM relative to the horizontally linearly polarized light directed into the system makes this overall system easier to produce than other conventional systems because only the orientation of the SLM relative to the compensator cell must be precisely controlled.

The orientation of the static quarter wave plate relative to the horizontally linearly polarized light directed into the system is also important. Generally, static quarter wave plate 408 has a primary axis which is oriented at a 45 degree angle to the horizontally linearly polarized light directed into the quarter wave plate.

Although the tilt angles of SLM 402 and compensator cell 404 are described as being 22.5 degrees, this is not a requirement. The configuration described above for this embodiment works regardless of the tilt angle of the FLC material of the SLM and the compensator cell, but works best when the tilt angles of the two components are the same. Therefore, it should be understood that the present invention would equally apply to systems using SLMs and compensator cells having tilt angles other than 22.5 degrees. With this configuration, the bright states obtained by the system remain bright regardless of the tilt angle used provided the tilt angles match. However, the use of tilt angles in the range of 22.5 to 25.5 degrees provides optimum dark state extinction, with the choice of tilt angle at the low end of the range providing best extinction over a narrow range of wavelengths centered on the wavelength for which the SLM and compensator have quarter-wave retardance and with the choice of tilt angle towards the tipper end of the range providing good extinction over a more extended range of wavelength. Increasing the tilt angle past 25.5 degrees eventually reduces dark state extinction.

Figure 4B:
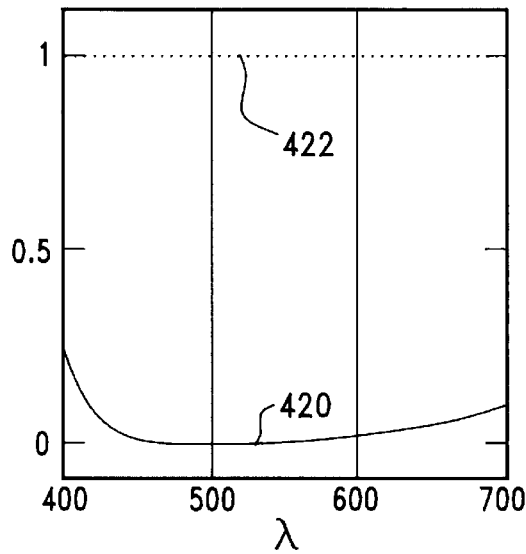
FIGS. 4b–c are graphs illustrating the effects the system of FIG. 4a has on light after it passes through the system.
Figure 4C:
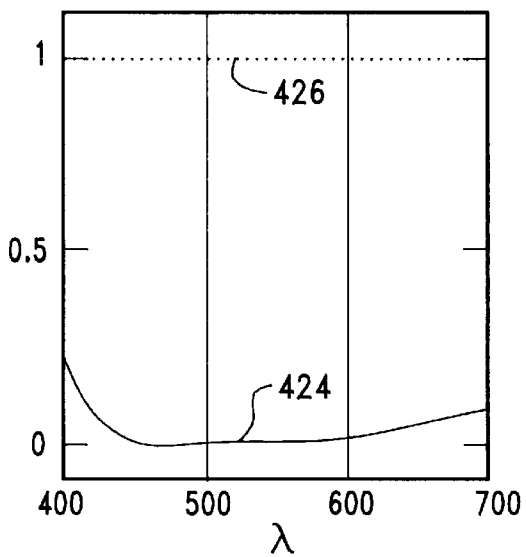

Now that the physical configuration of system 400 has been described, its effect on light directed into system 400 will be described. FIGS. 4b and 4c illustrate the net result that system 400 has on light directed in to the system. FIG. 4b shows the results for Case 1 and 2 during which the compensator cell is in its B state and the SLM is switched between the A state for Case 1 and the B state for Case 2. Case 1 is indicated by solid line 420 and Case 2 is indicated by dashed line 422. FIG. 4c shows the results for Case 3 and 4 during which the compensator cell is in its A state and the SLM is switched between the B state for Case 3 and the A state for Case 4. Case 3 is represented by solid line 424 and Case 4 is represented by dashed line 426. Cases 1–4 correspond to Cases 1–4 for the systems described above in the background.

As illustrated in FIGS. 4b and 4c, because of quarter wave plate 408 is included in the configuration of system 400, Cases 1 and 3 result in a dark pixel rather than a bright pixel and Cases 2 and 4 result in a bright pixel rather than a dark pixel. This is the opposite of the results described in the background. However, this inversion of the bright and the dark states may be compensated for in a variety of ways such as reversing the A and the B states for the SLM (i.e. using a −5 VDC to switch the pixel to the A state and using a 5 VDC to switch the pixel to the B state). The important thing is that the results of Cases 1 and 3 are identical and the results of Cases 2 and 4 are identical.

For system 400, static quarter wave plate 408 is preferably a readily providable achromatic quarter wave plate. The use of an achromatic static quarter wave plate provides the best results over a broad color spectrum because it flattens out the curves 422 of FIG. 4b and 426 of FIG. 4c representing the bright states obtained by Case 1 and Case 2. This flattening out of the curve improves the optical throughput of system 400 by increasing the amount of light which passes through the system for a given pixel when the combination of that pixel and the other elements are switched to produce a bright state.

Figure 5A:
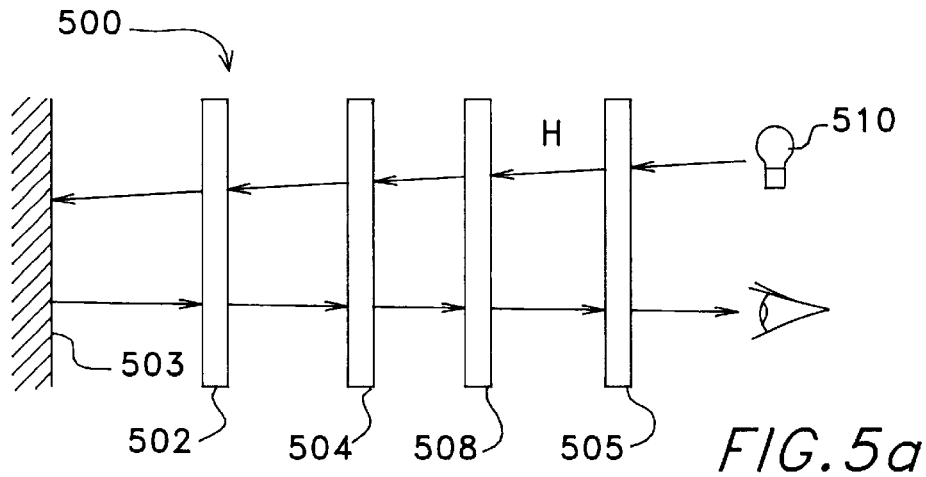
FIG. 5a is a diagrammatic cross sectional view of a second embodiment of a reflective SLM display system designed in accordance with the present invention.
Figure 5B:
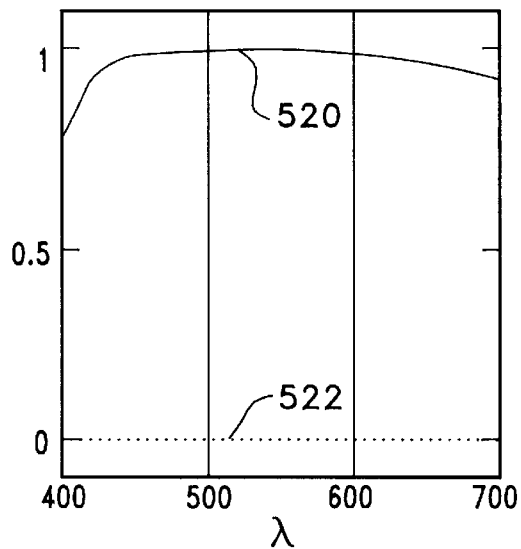
FIGS. 5b–c are graphs illustrating the effects the system of FIG. 5a has on light after it passes through the system.
Figure 5C:
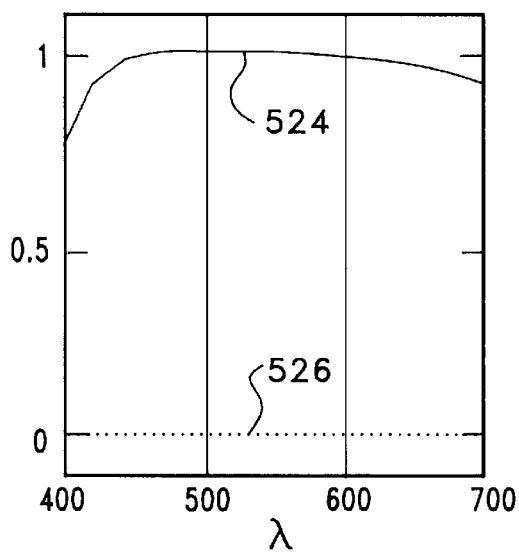

In one embodiment of the invention which reverses the bright and dark states described above for FIGS. 4a–c, parallel polarizers are used instead of crossed polarizers. FIG. 5a–c illustrate a system 500 which utilizes parallel polarizers. As described above for system 400, system 500 includes a SLM 502, a reflective backplane 503, a compensator cell 504, a polarizer 505, a static quarter wave plate 508, and a light source 510. Light source 510 directs light into polarizer 505 which blocks any vertically linearly polarized light and allows only horizontally linearly polarized light to pass through. This horizontally linearly polarized light then passes through and is acted upon by static quarter wave plate 508, compensator cell 504, SLM 502, and reflective backplane 503 in the same way as described above for FIG. 4a. However, in this embodiment, polarizer 505 also acts as the analyzer for the system. This use of polarizer 505 for both the polarizer and the analyzer is what makes this system a parallel polarizer system.

In the configuration of FIG. 5a, polarizer 505 acts as the analyzer by blocking any vertically linearly polarized light and allowing any horizontally linearly polarized light to pass into the viewing area. This is the opposite of the polarizations of light blocked and passed by analyzer 406 in system 400. This has the effect of reversing the bright and dark states of the system and results in the net effects illustrated in FIGS. 5b and 5c. FIG. 5b shows the results for Case 1 and 2 during which the compensator cell is in its B state and the SLM is switched between the A state for Case 1 and the B state for Case 2. Case 1 is indicated by solid line 520 and Case 2 is indicated by dashed line 522. FIG. 5c shows the results for Case 3 and 4 during which the compensator cell is in its A state and the SLM is switched between the B state for Case 3 and the A state for Case 4. Case 3 is represented by solid line 524 and Case 4 is represented by dashed line 526. Cases 1–4 correspond to Cases 1–4 for the systems described above in the background and Cases 1–4 described above for FIG. 4.

Figure 3B:
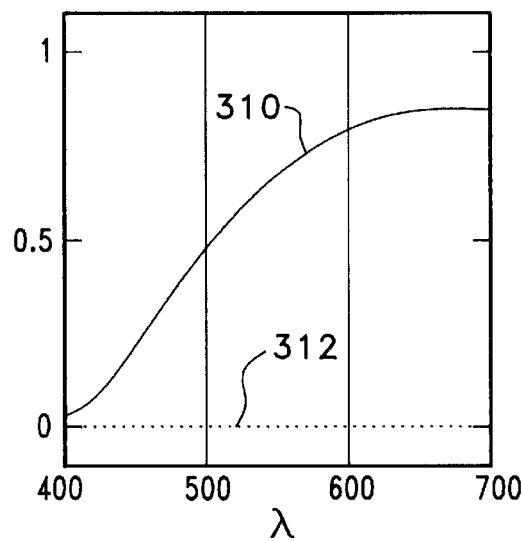
FIGS. 3b and 3c are graphs illustrating the effects the system of FIG. 3a has on light after it passes through the system.
Figure 3C:
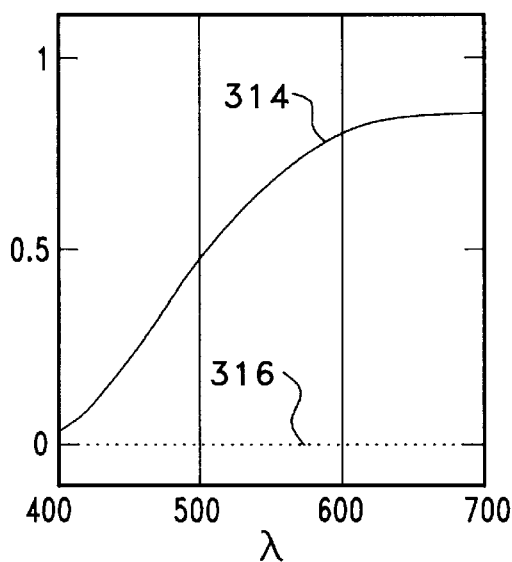

As clearly shown by FIGS. 5b and 5c, system 500 produces identical results, that is, a bright pixel for Case 1 and 3 as indicated by lines 520 and 524, respectively. It also produces identical results for Cases 2 and 4 as indicated by lines 522 and 526, respectively. This configuration also produces very good results over the entire wavelength range from 400 nm to 700 nm. In fact, as illustrated by lines 522 and 526, this configuration provides substantially uniform blockage of the entire range of wavelengths of the light that is directed into the spatial light modulator. Also, in both Cases 1 and 3, a large portion of the horizontally linearly polarized light passes through the system for the entire range of 400 nm to 700 nm. Since the point to adding the compensator cell is to increase the efficiency or brightness of the system, this arrangement dramatically improves the efficiency or brightness of system 500 over the complete wavelength range when compared to the system of FIG. 1b and 1c which simply turns OFF the light source during the DC field-balancing time. This also substantially improves the efficiency of the system compared to system 300 of FIG. 3 described above which does not include the static quarter wave plate. Furthermore, since essentially no light from the light source passes through the system to the viewing area when the elements are switched to produce a dark state as indicated by lines 522 and 526, this configuration also provides an excellent contrast ratio.

Figure 6:
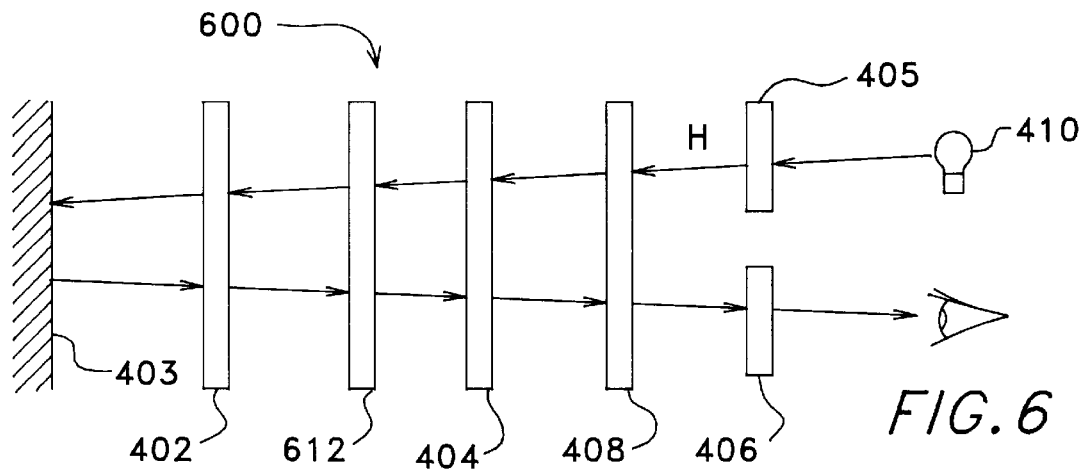

In another embodiment similar to system 400 of FIG. 4a, a birefringent element may be added to system 400 in order to provide results very similar to the results obtained by system 500 of FIG. 5a. Using like reference numerals to represent like components, FIG. 6 illustrates a system 600 including SLM 402, reflective backplane 403, compensator cell 404, polarizer 405, analyzer 406, static quarter wave plate 408, and light source 410. As described above for FIG. 4, polarizer 405 and analyzer 406 are crossed polarizers.

However, in accordance with this embodiment of the invention, system 600 further includes an additional birefringent element 612 which can be positioned between SLM 402 and compensator cell 404, as shown here, or alternately, can be positioned between compensator cell 404 and static quarter wave plate 408.

In this embodiment, birefringent element 612 is a commercially available polycarbonate film having a retardance of approximately one half of the wavelength of the light for which the system is optimized, for example a wavelength of 510 nm. Alternatively, birefringent element 612 may be any birefringent material capable of providing the desired retardance such as poly vinyl alcohol or any other optically clear birefringent material.

In this embodiment, the buff axes of SLM 402 and compensator cell 404 are parallel to one another and birefringent element 612 has a primary axis which is oriented perpendicular to the buff axis of both SLM 402 and compensator cell 404. As describe above for system 400, polarizer 405 directs horizontally linearly polarized light into quarter wave plate 408 and quarter wave plate 408 is oriented at a 45 degree angle to the horizontally linearly polarized light. SLM 402, compensator cell 404, and birefringent element 612 may be oriented in any way relative to quarter wave plate 408 so long as the buff axes of SLM 402 and Compensator cell 404 are parallel to one another and the primary axis of birefringent element 612 is perpendicular to the buff axes of SLM 402 and compensator cell 404.

The addition of the birefringent element causes Case 1 and Case 3 for this embodiment to result in a bright state in which the throughput varies only slightly over the range of the wavelengths similar to curves 520 and 524 of FIGS. 5b and 5c. Also, the addition of the birefringent element causes Case 2 and Case 4 for this embodiment to result in a substantially more uniform dark state similar to lines 522 and 526 of FIGS. 5b and 5c. This results in a system that is able to provide a high contrast ratio while maintaining a relatively high throughput for the entire wavelength range even though crossed polarizers are utilized.

Although the above described embodiments have been described as having the static quarter wave plate positioned between the polarizer and the compensator cell, this is not a requirement. Instead, the static quarter wave plate may be located between the compensator cell and SLM and still remain within the scope of the invention.

Figure 7A:
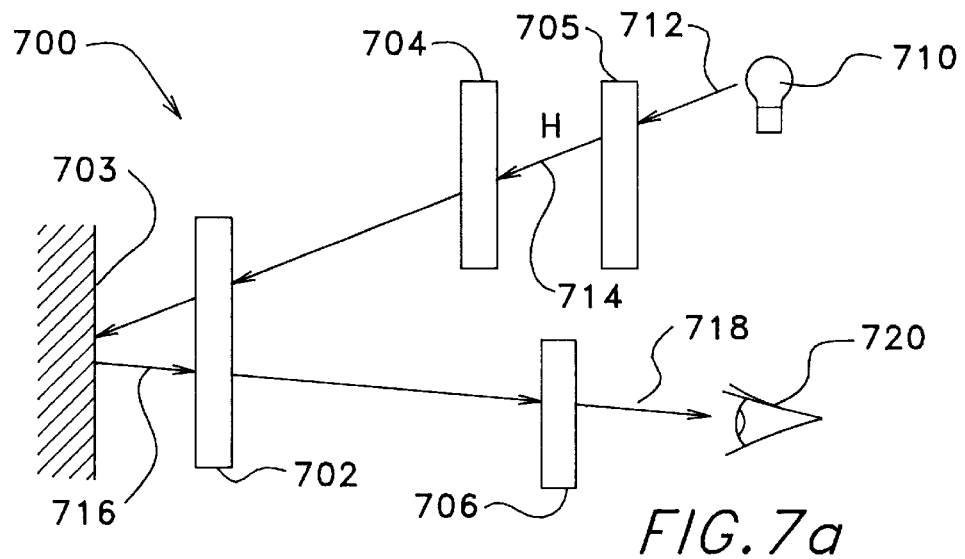
FIGS. 7a–b are diagrammatic cross sectional views of a fourth embodiment of a reflective SLM display system designed in accordance with the present invention.
Figure 7B:
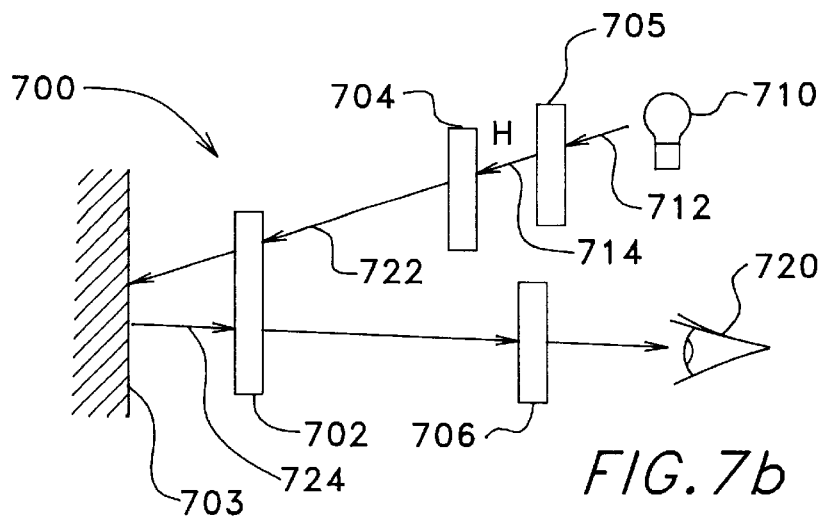

In another embodiment, an off axis system may be utilized in order to provide a continuously viewable DC field-balanced reflective display system. FIGS. 7a and 7b illustrate one embodiment of an off axis display system 700. As illustrated in FIGS. 7a and 7b, system 700 includes a SLM 702, a reflective backplane 703, a compensator cell 704, a polarizer 705, an analyzer 706, and a light source 710. In this embodiment, the light is directed into the SLM at an angle and reflected back into a viewing area indicated by viewer 720 such that the light directed into the system only passes through the compensator cell once rather than passing through the compensator cell twice as described above for the previously described embodiments.

Since the light only passes through compensator cell 704 once, the thickness of compensator cell 704 is configured to be twice the thickness of the SLM. Generally, SLM 702 has a thickness which causes SLM 702 to act as a quarter wave plate when switched to its A state and compensator cell 704 has a thickness which causes it to act as a half wave plate when it is switched to its A state. Therefore, in the case in which an FLC material is used for both the SLM and compensator cell that has a birefringence of 0.142, the thickness FLC material for the SLM would be approximately 900 nm and the thickness of the FLC material for the compensator cell would be approximately 1800 nm. Both SLM 702 and compensator cell are configured to have substantially no effect on the polarization of the light passing through them when they are switched to their B states.

For the configuration being described, polarizer 705 is configured to allow only horizontally linearly polarized light to be directed into the system. Analyzer 706 is configured to allow only vertically linearly polarized light to pass into the viewing area. Also, for this embodiment, the buff axis of compensator cell 704 is oriented perpendicular to the buff axis of SLM 702 and the buff axis of SLM 702 is advantageously oriented parallel to horizontally linearly polarized light directed into the system. Other orientations of the buff axes are also effective provided that the SLM and compensator cell buff axes remain perpendicular to one another.

As described above for the previous embodiments, the off axis configuration shown in FIGS. 7a and 7b provide identical results for Cases 1 and 3 and Cases 2 and 4. This configuration also provides good results over a broad spectrum similar to the results illustrated in FIGS. 5b and 5c. Therefore, system 700 is also able to provide a continuously viewable system which more effectively utilizes light from the light source when compared to the conventional reflective systems illustrated in FIGS. 1b–c and FIG. 3a.

Although only certain specific embodiments of the present invention have been described in detail, it should be understood that the present invention may be embodied in many other specific forms without departing from the spirit or scope of the invention. For example, although the systems have been described above as using horizontally linearly polarized light as the initial input light polarization, this is not a requirement. Instead, it should be understood that the initial input light polarization may alternatively be vertically linearly polarized light. Therefore, the present examples are to be considered as illustrative and not restrictive, and the invention is not to be limited to the details given herein, but may be modified within the scope of the appended claims.

What is claimed is:

1. A reflection mode, ferroelectric liquid crystal spatial light modulating system, comprising:
   (a) a light reflecting type spatial light modulator including a light reflecting surface cooperating with a layer of ferroelectric liquid crystal light modulating medium switchable between first and second states so as to act on light in different first and second ways, respectively;
   (b) a switching arrangement for switching the liquid crystal light modulating medium between the first and second states;
   (c) an illumination arrangement for producing a source of light; and
   (d) an optics arrangement optically coupled to the spatial light modulator and the illumination arrangement for directing light along a first optical path from the source of light into the spatial light modulator for reflection back out of said modulator and for directing reflected light along a second optical path from the spatial light modulator into a predetermined viewing area, the optics arrangement including
      (i) a passive wave plate positioned in both the first optical path between the light source and the spatial light modulator and in the second optical path between the spatial light modulator and the viewing area; and
      (ii) a compensator cell positioned in both the first optical path between the light source and the spatial light modulator and in the second optical path between the spatial light modulator and the viewing area, the compensator cell having a layer of ferroelectric liquid crystal light modulating medium switchable between a primary and a secondary state so as to act on light in different primary and secondary ways, respectively.

2. A system according to claim 1 wherein the passive wave plate is a quarter wave plate.

3. A system according to claim 1 wherein:
   (a) the spatial light modulator is an active matrix spatial light modulator with its liquid crystal light modulating medium being divided into an array of individually controllable pixels; and
   (b) the switching means includes means for switching each of the pixels between the first and second states.

4. A system according to claim 1 wherein the optics arrangement further includes a polarizer element positioned in the first optical path between the light source and the spatial light modulator for polarizing the light directed in to the spatial light modulator and an analyzer element positioned in the second optical path between the spatial light modulator and the viewing area for allowing light of a certain polarization to pass through the analyzer to the viewing area.

5. A system according to claim 4 wherein the polarizer and analyzer are crossed to one another.

6. A system according to claim 4 wherein the polarizer and analyzer are oriented parallel to one another.

7. A system according to claim 6 wherein the polarizer and analyzer are provided by a single polarizing element positioned in both the first optical path between the light source and the spatial light modulator and in the second optical path between the spatial light modulator and the viewing area.

8. A system according to claim 1 wherein:
   (a) the optics arrangement further includes a combination polarizer-beam splitter-analyzer positioned in both the first optical path between the source of light and the spatial light modulator and in the second optical path between the spatial light modulator and the viewing area so as to be able to direct light from the source of light to the spatial light modulator and from the spatial light modulator to the viewing area;
   (b) the passive wave plate is positioned optically between the spatial light modulator and the combination polarizer-beam splitter-analyzer; and
   (c) the compensator cell is positioned optically between the spatial light modulator and the combination polarizer-beam splitter-analyzer.

9. A system according to claim 8 wherein the compensator cell is positioned optically between the spatial light modulator and the passive quarter wave plate.

10. A system according to claim 1 wherein the ferroelectric liquid crystal of both the spatial light modulator and the compensator cell each has a buff axis, the buff axis of the spatial light modulator being oriented perpendicular to the buff axis of the compensator cell.

11. A system according to claim 1 wherein the ferroelectric liquid crystal layers of both the spatial light modulator and the compensator cell have tilt angles and retardances that are equal to one another.

12. A system according to claim 1 wherein the ferroelectric liquid crystal layers of both the spatial light modulator and the compensator cell have the same thickness.

13. A system according to claim 12 wherein the spatial light modulator and the compensator cell both act as quarter wave plates.

14. An optics arrangement for directing light from a light source along a first optical path into a reflective type liquid crystal spatial light modulator that is switchable between a first and a second state and for directing light reflected from the spatial light modulator along a second optical path into a predetermined viewing area, the optics arrangement comprising:

parallel polarizers for polarizing the light directed into the spatial light modulator and for analyzing the light directed from the spatial light modulator to the viewing area, the optics arrangement being configured such that the parallel polarizers provide substantially uniform blockage of the light directed from the spatial light modulator into the viewing area when the spatial light modulator is in the second state, the blockage of the light being substantially independent of wavelength, and a passive wave plate located in both the first optical path from the light source to the spatial light modulator and in the second optical path from the spatial light modulator to the viewing area.

15. A system according to claim 14 wherein the parallel polarizers are provided by a single polarizer located in both the first optical path from the light source to the spatial light modulator and in the second optical path from the spatial light modulator to the viewing area.

16. A system according to claim 14 wherein the spatial light modulator is an active matrix spatial light modulator divided into an array of individually controllable pixels each of which is switchable between an On and an Off state.

17. A system according to claim 14 wherein the passive wave plate is a quarter wave plate.

18. A system according to claim 17 wherein the optics arrangement further includes a compensator cell positioned in both the first optical path between the light source and the spatial light modulator and in the second optical path between the spatial light modulator and the viewing area, the compensator cell having a layer of ferroelectric liquid crystal light modulating medium switchable between a primary and a secondary state so as to act on light in different primary and secondary ways, respectively.

19. A system according to claim 18 wherein the compensator cell is positioned optically between the spatial light modulator and the passive quarter wave plate.

20. A system according to claim 19 wherein the ferroelectric liquid crystal of both the spatial light modulator and the compensator cell have a buff axis, the buff axis of the spatial light modulator being oriented perpendicular to the buff axis of the compensator cell.

21. A system according to claim 20 wherein the ferroelectric liquid crystal of both the spatial light modulator and the compensator cell have tilt angles and retardances that are equal to one another.

22. A system according to claim 21 wherein the spatial light modulator and the compensator cell both act as quarter wave plates.

* * * * *